(12) United States Patent
Ohgaki

(10) Patent No.: US 6,898,014 B2
(45) Date of Patent: May 24, 2005

(54) MICRO LENS MOLDING PIECE, MICRO LENS MOLDING PIECE PRODUCING METHOD, MICRO LENS STAMPER, MICRO LENS STAMPER PRODUCING METHOD, MICRO LENS MOLD MEMBER, PLASTIC LENS ARRAY SHEET, AND PROJECTOR

(75) Inventor: Masaru Ohgaki, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/652,416

(22) Filed: Aug. 29, 2003

(65) Prior Publication Data

US 2004/0104111 A1 Jun. 3, 2004

(30) Foreign Application Priority Data

Aug. 30, 2002 (JP) ........................................ 2002-255410

(51) Int. Cl.[7] .......................... G02B 27/10; H01L 21/00
(52) U.S. Cl. .......................................... 359/619; 438/29
(58) Field of Search ................................ 359/619, 620; 438/29, 30

(56) References Cited

U.S. PATENT DOCUMENTS

| | | | |
|---|---|---|---|
| 6,404,555 B1 | * | 6/2002 | Nishikawa .................. 359/619 |
| 6,653,705 B2 | * | 11/2003 | Ushijima et al. ........... 257/432 |
| 2003/0127429 A1 | | 7/2003 | Ohgaki |

* cited by examiner

Primary Examiner—Scott J. Sugarman
Assistant Examiner—M. Hasan
(74) Attorney, Agent, or Firm—Cooper & Dunham LLP

(57) ABSTRACT

A micro lens molding piece includes a substrate having electrical conductivity at least on its surface. The surface is patterned with an insulation layer including at least one opening. An electro deposition start section is formed on the substrate and is exposed from the opening. An electro deposition start electrode is provided in the electro deposition start section and protrudes from the insulation layer by a prescribed length substantially determining a shape of a micro lens. A metal layer is electrically deposited in a shape of the micro lens by the electro deposition start electrode when electro deposition is performed.

31 Claims, 8 Drawing Sheets

MICRO LENS MOLDING PIECE, MICRO LENS MOLDING PIECE PRODUCING METHOD, MICRO LENS STAMPER, MICRO LENS STAMPER PRODUCING METHOD, MICRO LENS MOLD MEMBER, PLASTIC LENS ARRAY SHEET, AND PROJECTOR

FIELD

The present patent specification relates to a micro lens molding piece, micro lens molding piece producing method, micro lens stamper, micro lens stamper producing method, micro lens mold member, plastic lens array sheet, and projector, in particular to such products and methods suitable for optical communications use of an coupling lens array, digital camera, projector, three-dimensional display, and other products.

BACKGROUND

Conventionally, as discussed in Japanese Patent Application Laid Open No. 11-320572, a lens use die can be made by forming a first metal layer on an insulating substrate and covering the first metal layer with an insulation coat having an opening. Electroplating is then performed while a portion of the first metal layer, which is exposed from the opening, functions as an electrode. Thus, a plated metal is deposited starting from the first metal layer exposed from the opening, thereby a micro lens use die is formed.

A shielding frame (i.e., other that a lens portion) can be arranged so that an eccentric micro lens use cavity can be formed.

However, according to the conventional micro lens, since a radius of curvature of a micro lens is not readily adjustable at its central portion exerting the maximum lens usage efficiency, a problem is that the radius of the curvature is larger at the central portion and smaller at a peripheral portion of the micro lens than a deposition radius "r" as illustrated in FIG. 9A. As a result, a conventional lens can unavoidably include large aberration. Further, since a shielding frame area is not utilized as a lens, light-usage efficiency can be reduced.

SUMMARY

Accordingly, an object is to address and resolve such problems and provide a new micro lens molding piece. The above and other objects are achieved by providing an improved micro lens molding piece including a substrate having electrical conductivity at least on its surface patterned with an insulation layer having at least one opening. An electro deposition start section is formed, exposed from the opening. An electro deposition start electrode is provided in the electro deposition start section and protrudes from the insulation layer by a prescribed length substantially determining a shape of a micro lens. A metal layer is electrically deposited in a shape of the micro lens by the electro deposition start electrode when electro deposition is performed.

In another embodiment, a concavity and convexity (hill and valley) pattern is formed on the surface of the substrate, a vertical interval of which is determined in accordance with a shape of the micro lens. The insulation layer is formed on the concavity and convexity pattern with at least one opening at a prescribed position of the concavity and convexity pattern.

In yet another embodiment, the opening accommodates a peak of the concavity and convexity pattern.

In yet another embodiment, the opening accommodates a concave bottom of the concavity and convexity pattern.

In yet another embodiment, the concavity and convexity pattern is formed on the surface of the insulation layer having at least one opening at its prescribed position.

In yet another embodiment, a shape of the opening is any one of circular, elliptic, line state, and any combination thereof.

In yet another embodiment, an additional metal layer is additionally electrically deposited on the surface of the metal layer firstly electrically deposited.

In yet another embodiment, the electro deposition is a type of pulse electro deposition, a frequency of which is gradually increased from an initial to final stage.

In yet another embodiment, the metal layer firstly electrically deposited is not a brilliance type, and the additional metal layer is a brilliance type.

DETAILED DESCRIPTION OF THE DRAWINGS

A more complete appreciation of the present disclosure and many of the attendant advantages thereof will be readily obtained as the same becomes better understood by the following detailed description when considered in connection with the accompanying drawings, wherein:

FIGS. 1A to 1D collectively illustrate a first example of a method for producing a micro lens molding piece according to a preferred embodiment in comparison to a conventional method;

FIGS. 2A to 2E collectively illustrate a method for producing a stamper using a micro lens molding piece illustrated in FIG. 1B;

PREFERRED EMBODIMENTS

Figure 1A:
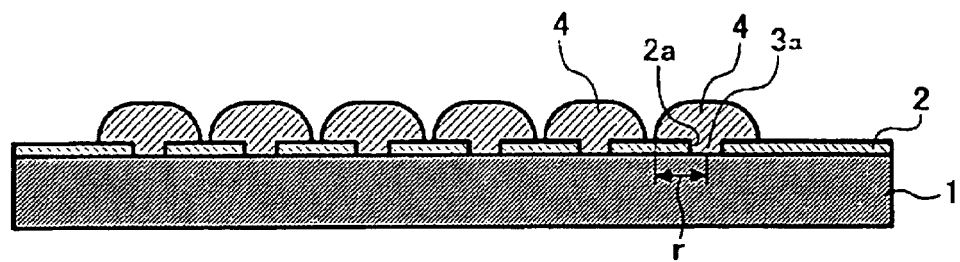
Figure 1B:
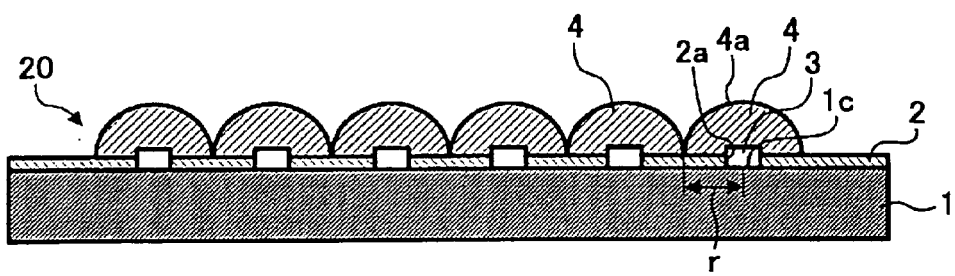
Figure 9A:
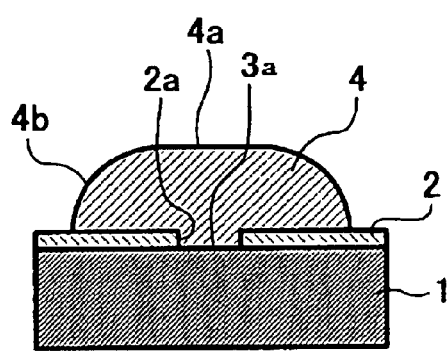
FIGS. 9A and 9B illustrate examples of electro deposition coats using and not using concavity and convexity of a substrate.

Referring now to the drawings, wherein like reference numerals designate identical or corresponding parts throughout several views, in particular in FIGS. 1A and 1B, a conventional micro lens molding piece is produced in such a manner that a surface of a substrate 1 having electrical conductivity at least at its surface is patterned with an insulating layer 2. An exposure opening section 3a is exposed from an opening 2a formed through the insulating layer 2 as an electro deposition start section. Then, a deposition metal layer 4 is formed in a lens shape by electrically depositing a metal from the opening exposure section. Such a substrate 1 is preferably includes conductivity at least at its surface, and is exemplified by a metal plate and a glass plate with sputtered metal at its surface and similar. As illustrated in FIG. 9A, a conventional micro lens molding piece has a problem that a radius of curvature is larger at its central section than that of the deposition metal layer 4 represented by a deposition radius "r" (see FIG. 1B), thereby causing impermissible aberration of a lens.

Then, as illustrated in FIG. 1B, if a deposition start electrode 3 having a cylindrical shape is arranged within the opening 2a, protruding from the insulating layer 2, and electro deposition is then performed while causing the deposition start electrode 3 to function as an electro deposition start section, the radius of curvature can be minimized at the central portion 4a of the deposition metal layer 4. In order to form such a cylindrical deposition start electrode 3, a deposition start electrode section is patterned, for example, with a thick photo resist coat, and electro deposition is performed up to a section in the vicinity of a photoresist surface. Then, the photoresist is subjected to a half etching process. Thereby, a protruding electro deposition start electrode is formed.

Figure 1C:
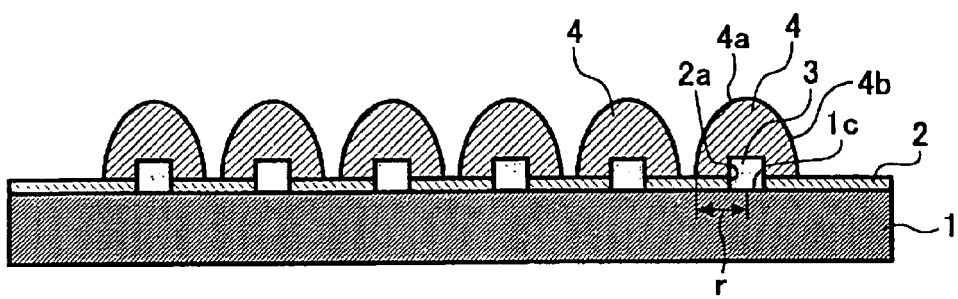

Further, as illustrated in FIG. 1C, if the cylindrical deposition start electrode 3 protrudes from the opening 2a more than in the case of FIG. 1B, and electro deposition is then performed while utilizing the deposition start electrode 3 as an electro deposition start section, a radius of curvature of the deposition metal layer 4 can be further reduced as compared with the deposition metal layer 4 of FIG. 1B at its central portion 4a. Specifically, a radius of the curvature of the deposition metal layer 4 can be adjusted and minimized at its central portion 4a in accordance with a height of a deposition start electrode 3.

Further, if a height of a deposition start electrode 3 is adjusted suitably, the radius of curvature of the deposition metal layer 4 can be the same to the deposition radius "r" serving as the radius of the deposition metal layer 4 at its central portion. As a result, aberration can be suppressed.

Further, if a height of a deposition start electrode 3 is increased in order to correct aberration, an aspheric surface shape having a smaller radius of curvature than that of the deposition radius "r" can be obtained at a central portion 4a.

In this way, an electro deposition electrode 3 is arranged in an electro deposition start section exposed from the opening 2a, and protrudes from the insulating layer 2 in accordance with a micro lens shape. Then, a metal is electrically deposited from the electro deposition electrode 3; thereby a die piece of a micro lens shape can be produced.

Specifically, as illustrated in FIGS. 1B and 1C, by changing a positional relation between a bottom of an opening 2a of an insulating layer 2 serving as an insulating coat and an electro deposition start section, and thereby adjusting a radius of a curvature, a micro lens shape having a smaller or equivalent radius of curvature to a deposition radius "r" can be obtained.

Figure 1D:
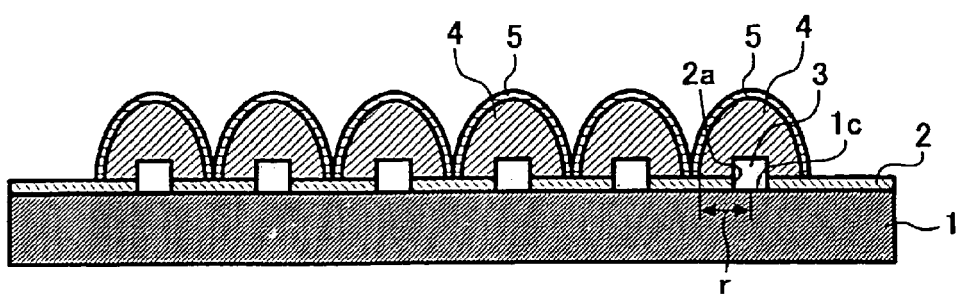

Further, as illustrated in FIG. 1D, a deposition metal layer 4 can be made of copper as a first step. As a second step, a brilliance metal layer 5 is formed by covering the deposition metal layer 4 with a nickel brilliance coat. A copper plated portion serving as a non-brilliance electro deposition metal layer forms a core shape generating less of internal stress therein. Further, a nickel portion serving as a second, brilliance electro deposition layer easily achieves fine corrosion photo resistance and a mirror state. In the above, copper vitriol bath is utilized in a primary electro deposition. A watt bath is utilized in a secondary electro deposition.

A method for producing a stamper according to the preferred embodiment is now described with reference to FIGS. 2A to 2E. However, the stamper can be similarly produced when a later mentioned micro lens molding piece other than that described below is utilized.

Figure 2A:
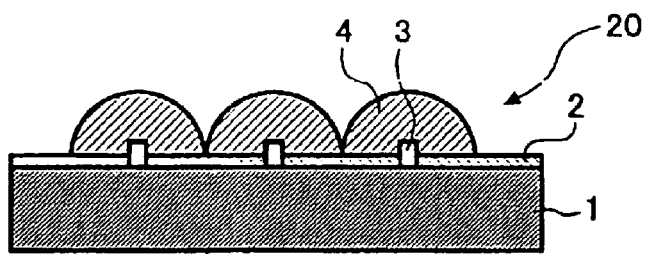
Figure 2B:
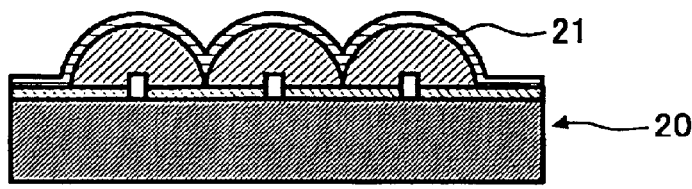

As shown in FIG. 2A, a micro lens molding piece 20 produced in the above-mentioned manner is used as a die master. As shown in FIG. 2B, a Nickel coat 21 is formed on the surface of the micro lens molding piece 20 by means of sputtering.

Figure 2C:
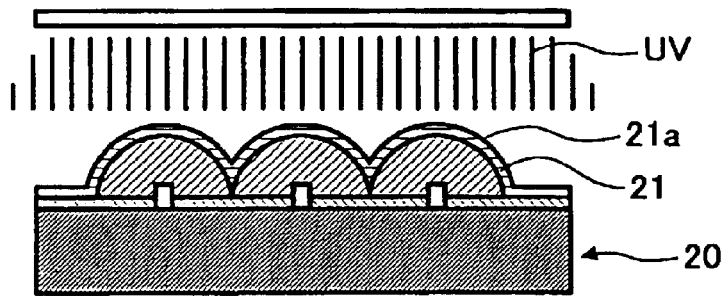

A peel off treatment is then applied to the surface of the Nickel coat 21. The peel off treatment irradiates a ultra-violet light "UV" more than 30 minutes, preferably more than 60 minutes, in atmosphere in which an oxygen density is more than 21%, as illustrated in FIG. 2C.

Through this process, oxygen in the atmosphere is partially decomposed to ozone by the ultra-violet light, and a significantly thin oxygen layer 21a is formed on the surface of the micro lens molding piece 20. This layer serves as a peel boundary face between the micro lens molding piece 20 and a stamper 22 formed thereafter by electro deposition, thereby the micro lens molding piece 20 can readily be peeled off from the stamper 22.

As another type of peel off treatment, a release agent of a Fluorine type capable of functioning with a significantly thin film is coated and heated 30 minutes at high temperature such as around 180 degree Centigrade. A solvent of the Fluorine type then removes needless releasing agent, thereby a release layer is formed. The formed release layer has a thickness of about few molecular layers and functions to peel while maintaining conductivity.

Figure 2D:
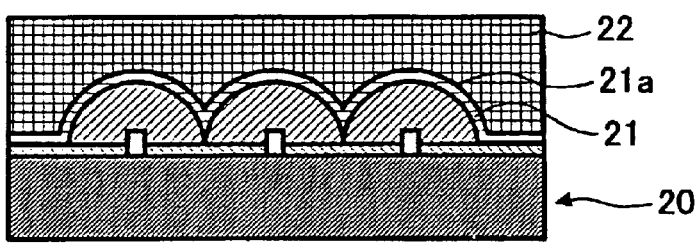
Figure 2E:
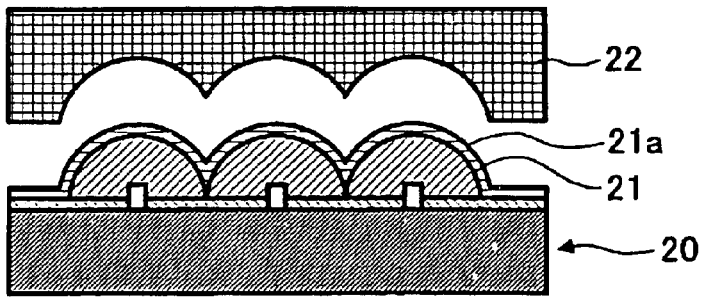

Then, as illustrated in FIG. 2D, Nickel electro deposition is performed so that depositing metal can have a thickness of more than 100 micrometers, in sulfamic acid-nickel bath while using the micro lens molding piece 20 that has been subjected to the above mentioned processes as a negative electrode. Subsequently, a stamper 22 can be obtained when the micro lens molding piece 20 is peeled from the Nickel coat subjected to the electro deposition as illustrated in FIG. 2E.

As shown, the micro lens molding piece 20 includes a semi-spherical portion in a lens shape. The semi-spherical portion is connected to the substrate 1 only via an opening 2a of a photo resist coat serving as an insulating layer 2, and the diameter of the opening 2a is only one fifth of a lens diameter. Accordingly, unless the above-mentioned peel process is well executed, the lens shape portion is taken in to a Nickel coat side (i.e., the stamper 22) rather than the micro lens molding piece 20 side, thereby causing imperfections.

Such imperfections also related to a surface roughness of the micro lens molding piece 20. Specifically, the imperfection frequently occurs when the surface roughness "Ra" is more than 200 nm. For this reason, the Ra of the micro lens 20 should be less than 200 nm so that the surface can be smooth.

Figure 3A:
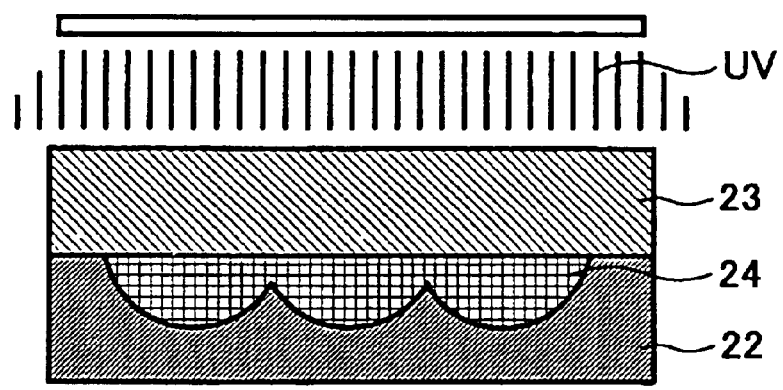
FIGS. 3A and 3B illustrate one example of a method for producing a plastic lens array sheet using the STAMPER of FIG. 2.
Figure 3B:
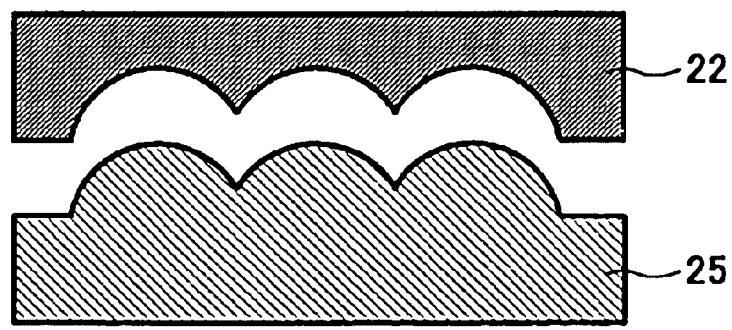

One example of a method for producing a plastic lens sheet is now described with reference to FIGS. 3A and 3B.

As shown, ultra-violet light curable resin 24 is filled as energy curable resin between the stamper 22 obtained in the above-mentioned manner with reference to FIGS. 2A–2E and a translucency substrate 23. A UV light is then irradiated from the side of the translucency substrate 23. As a result, a lens array sheet 25 can be produced as one example of a micro lens mold member in a lens shape having reverse concavity-and convexity to those of the stamper 22. If a lens array sheet to be produced is relatively large, a step and repeat manner can be employed.

Further, heat curable resin can be used in place of the ultra-violet light curable resin and heating can be used instead of irradiation of the ultra-violet light to the energy-curable resin.

Further, electron beam curable resin can be used in place of irradiation of the ultra-violet light curable resin and cured by an electron beam instead of irradiation of the ultra-violet light to the energy-curable resin.

Figure 4A:
FIGS. 4A to 4C illustrate another example of a method for producing a plastic lens array sheet using the stamper of FIG. 2.

A modified method for producing a plastic lens sheet is now described with reference to FIGS. 4A to 4C. As shown in FIG. 4A, a stamper 22, a sheet 26 made of thermoplastic translucency material, and a press die 27 having a flat molding surface are provided.

Figure 4B:
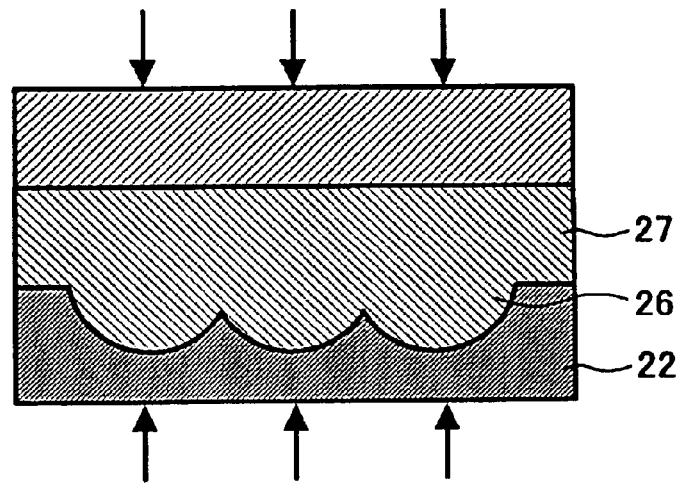

Then, as shown in FIG. 4B, both or any one of the stamper 22 and sheet 26 are heated up to a level higher or equal to a softening temperature of the sheet 26. These stamper 22 and sheet 26 are then pressed with a pree die 27. Subsequently, they are maintained pressed until the temperature decreases to a level less or equal to the softening level while the stamper is pressed thereto.

Figure 4C:
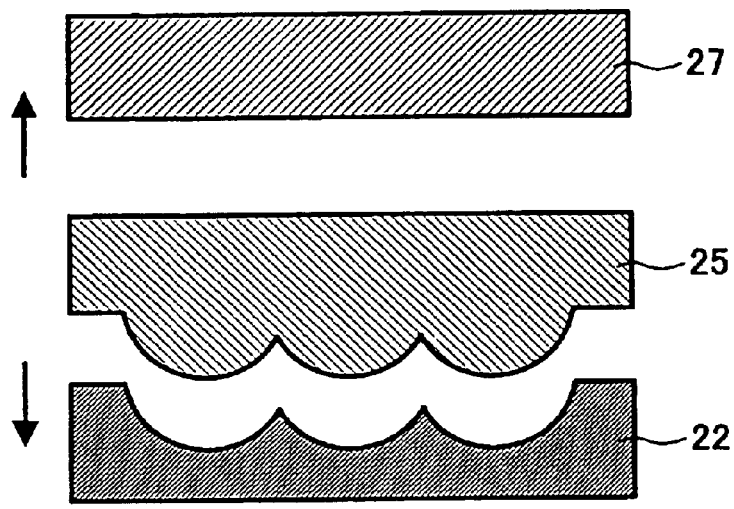

Then, as shown in FIG. 4C, the stamper 22 and press die 27 are peeled off from the sheet, thereby a lens array sheet 25 can be obtained as a micro lens mold member in a lens shape having reverse concavity and convexity to those of the stamper 22. In place of the thermoplastic translucency member, polycarbonate plastic, PET (poly-ethylene terephthalate), and acrylic or the like can be utilized.

Further, if a film of a fluorine type is formed on the surface of the stamper before such a lens array sheet 25 is molded, the lens array sheet 25 as a transfer member can be readily peeled off from the stamper 22, thereby the stamper 22 can have longer service life.

Further, if a lens array sheet to be produced is relatively large (e.g. 2 meter per a side), a step and repeat manner can be employed.

The lens array sheet 25 as mentioned-above can be used as an optical communications coupling lens array, in particular, as a junction (connection) connecting a hundred micro lenses.

Further, if used in a digital camera, the lens array sheet is located in front of a CCD as a sheet of condensing use lenses.

Further, if three lens array sheets are overlapped and positioned appropriately, a three dimensional display can be formed.

The second embodiment of a method for producing a micro lens molding piece is now described with reference to FIG. 5. As shown, a micro lens molding piece has a triangle shape concavity and convexity pattern on a substrate. An opening 2a is formed on a peak of the substrate as an electro deposition start opening pattern. Specifically, the opening 2a is formed through an insulation layer 2 and accommodates a peak of a concavity and convexity pattern. Since a deposition start electrode 3 protrudes from the opening 2a, a radius of concave curvature of a deposition metal layer 4 is smaller at its central portion 4a than that of the deposition radius "r". Further, a depositing region is wide at a peripheral section 4b, and a radius of curvature is larger than that of the deposition radius "r" at the peripheral section 4b.

A third embodiment of a method for forming a micro lens molding piece is now described with reference to FIG. 6. As shown, a micro lens molding piece includes a triangle shape concavity and convexity pattern on a substrate as similar to the second embodiment described with reference to FIG. 5. Specifically, an opening 2a is formed at a bottom of a concavity of the concavity and convexity pattern as electro deposition start opening. Specifically, the opening 2a is formed through an insulation layer 2 and includes the lowest point of the concavity. Since a deposition start electrode 3 is concave from the opening 2a, a radius of concave curvature of a deposition metal layer 4 is larger at its central portion 4a than that of the deposited radius "r". Further, since a depositing region is narrow at a peripheral section 4b, a radius of curvature is smaller at the peripheral section 4b than that of the deposition radius "r".

Further, if electro deposition is started from a middle point other than the peak and valley of a concavity and convexity pattern, distribution of a radius of curvature can intentionally be formed on a lens. To achieve the same, a photo resist is coated on a substrate having a concavity and convexity pattern, and an opening pattern is projected thereto.

Figure 5:
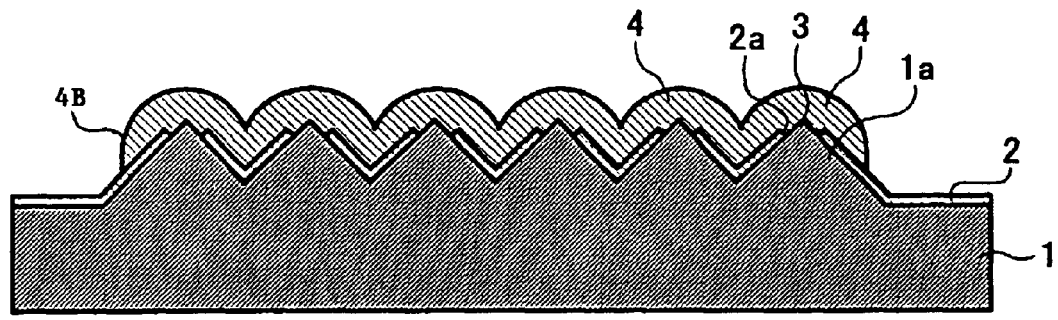
FIG. 5 illustrates a second example of a method for producing a micro lens molding piece according to a preferred embodiment.
Figure 6:
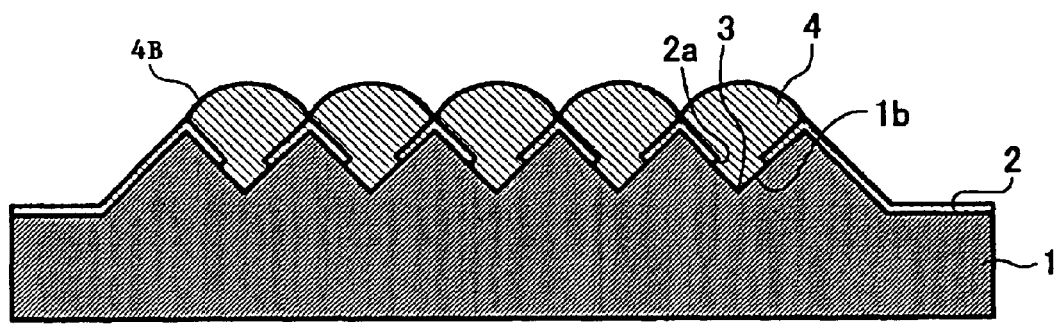
FIG. 6 illustrates a third example of a method for producing a micro lens molding piece according to a preferred embodiment.

In both of the embodiments of FIGS. 5 and 6, when a die piece having a micro lens shape is to be produced by patterning a surface of a substrate 1 having conductivity at least on its surface with an insulating layer 2 having an opening 2a, and performing electro metal deposition starting from an electro deposition start section exposed from the opening 2a, a concavity and convexity pattern is formed for the patterning on the surface of the substrate 1, and its vertical interval and/or angle is changed in accordance with a shape of a micro lens to be produced.

Further, electro deposition can be started from a prescribed electro deposition start section of the concavity and convexity pattern of the substrate exposed from the opening 2a.

Further, a parameter capable of determining a radius of curvature is a height of the electrode in the embodiment of FIG. 1. Whereas in the embodiment of FIG. 5, such determination is executed by changing a vertical interval and/or angle of a groove of the concavity and convexity pattern from 110 up to 150 or down to 90 degrees Centigrade.

When the vertical interval is increased, the effect is similar to increasing the height of a start electrode as illustrated in FIG. 1C. Whereas, when the vertical interval is decreased, the effect is similar to decreasing the height.

Further, when the angle is increased, a radius of curvature has a tendency as shown in FIG. 1A. Whereas, when the angle is increased as shown in FIGS. 5 and 6 from a flat substrate as shown in FIG. 1A, the radius of curvature can be small at a lens central section right above the opening section.

As a result, a radius of curvature can be smaller at a lens central section conventionally having a larger radius of curvature at a portion right above an opening section. Specifically, if desired, a substantially spherical surface portion can be obtained.

A fourth embodiment of a micro lens molding piece producing method according to a preferred embodiment is now described with reference to FIG. 7. As shown, a micro lens molding piece includes a concavity and convexity on a photo resist serving as an insulting layer 2. Electro deposition is then started from a deposition start electrode 3 exposed from an opening 2a that penetrates a convex section 2b of the insulting layer 2. Since deposition metal enters into a wide space upon tilling and overflowing the opening 2a, a deposition speed in a radius direction becomes slow. Thereby, a radius of curvature is smaller at its section than the deposition radius "r".

A fifth embodiment of a micro lens molding piece producing method according to a preferred embodiment is now described with reference to FIG. 8. As shown, a micro lens molding piece includes a concavity and convexity pattern on an insulating layer 2 having an opening 2a. A taper portion 2c is formed outside the opening 2a. Then, electro metal deposition is performed. Due to the taper portion 2c, a radius of curvature of a convex deposition metal layer 4 is larger at its central section 4a in comparison to the deposition radius "r". Further, since an electro-deposition region of a peripheral section 4b is narrow, a radius of curvature is larger at the peripheral section 4b in comparison to the deposition radius "r".

Figure 7:
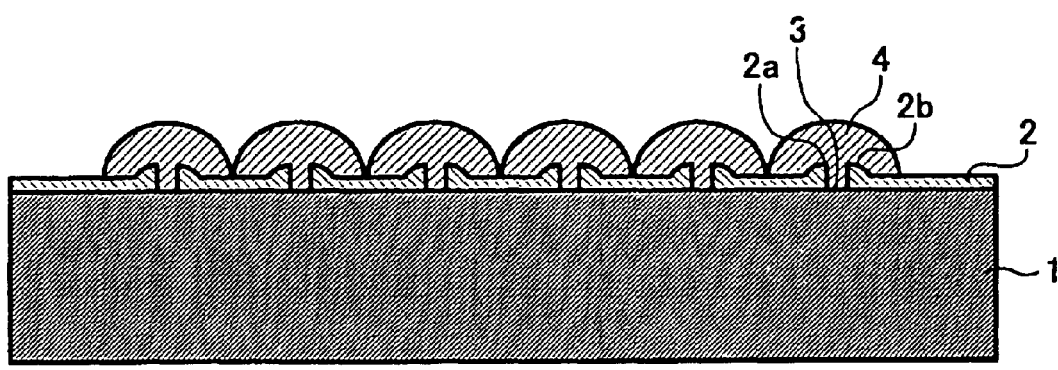
FIG. 7 illustrates a fourth example of a method for producing a micro lens molding piece according to a preferred embodiment.
Figure 8:
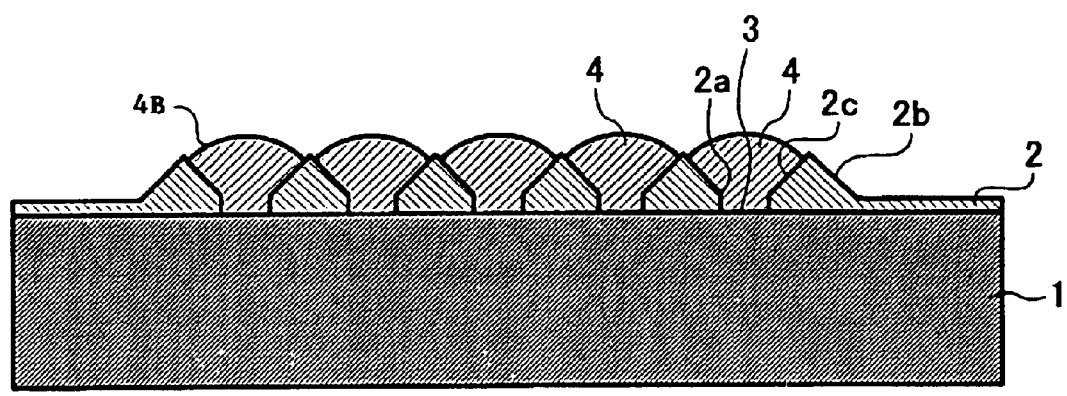
FIG. 8 illustrates a fifth example of a method for producing a micro lens molding piece according to a preferred embodiment.

For the concavity and convexity and of the insulating layer 2 in the above-mentioned embodiment of FIGS. 7 and 8, the opening sections can be formed in a pattern while using a gray mask and controlling light exposure, for example, after providing concavity and convexity.

Specifically, these embodiments of FIGS. 7 and 8 form a concavity and convexity pattern on the substrate 1 having conductivity owing to the photo resist serving as the insulating layer 2, and perform electro-deposition from the deposition start electrode 3 exposed from the opening. In particular, the embodiment of FIG. 7 raises the photo resist in a convex shape and performs electro-deposition from its central section. In contrast, the example of FIG. 8 performs electro-deposition from a valley section.

As shown in FIGS. 7 and 8, when a metal die having a micro lens shape is produced by forming the insulating layer 2 in a pattern on the surface of the substrate 1 having conductivity at least at its surface, and performing electro metal deposition from the electro deposition start section exposed from the opening 2a of the patterned insulating layer 2, a protruding shape of the concavity and convexity pattern is changed in accordance with a micro lens shape. Further, electro deposition is performed starting from the electro deposition start section exposed from the opening 2a arranged at a prescribed position of the concavity and convexity pattern.

Figure 9B:
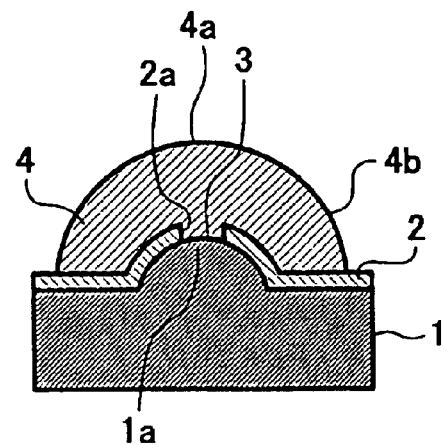

FIG. 9A illustrates one example of conventional electro deposition using a flat substrate. FIG. 9B illustrates electro deposition performed starting from a convex pattern section 3a in a concavity and convexity pattern formed on the substrate 1. As shown, in comparison to the example of FIG. 9A, a radius of curvature is small at a central section 4a and large at its peripheral section 4b of a deposition metal layer 4.

As shown, a radius of curvature of a deposition metal layer 1 of FIG. 9B is smaller at its central section 4a and larger at its peripheral section 4b each in comparison to that of FIG. 9A. Accordingly, an area having a large radius of curvature appears at a lens central section, and thereby aberration becomes large in the former example. In contrast, a radius of curvature at a lens central section becomes small, and thereby aberration becomes smaller in the latter example.

One example of a micro lens molding piece is now described with reference to FIGS. 10A and 10B.

Figure 10B:
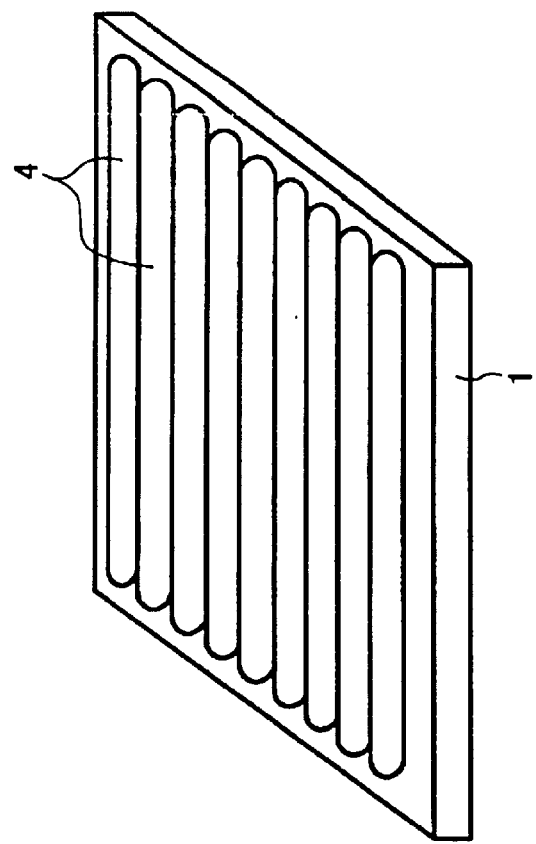
FIGS. 10A and 10B illustrate examples of micro lens molding pieces.
Figure 10A:
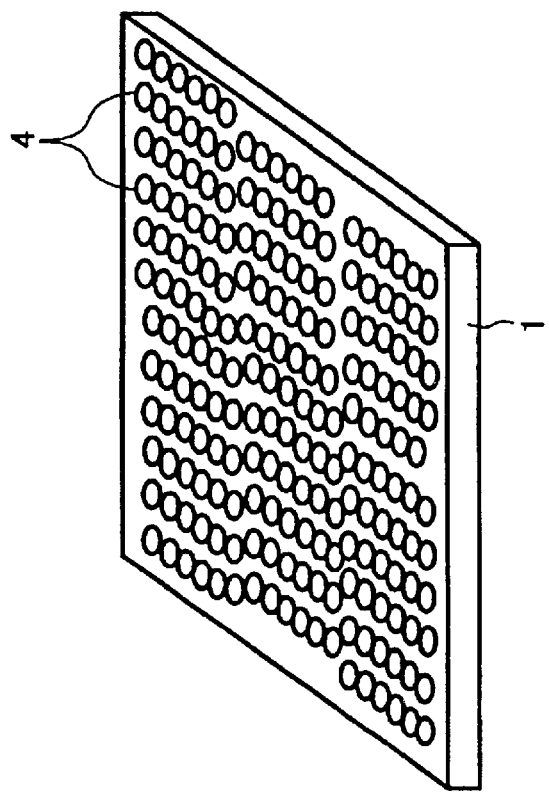

As shown in FIG. 10A, a lens array sheet can be formed by performing electro-deposition and forming a deposition metal layer 4 using a micro lens molding piece formed from dot like circular openings. Further, as shown in FIG. 10B, a reticular type lens piece can be formed by depositing a deposition metal layer 4 using a micro lens molding piece formed from a line pattern. Beside these, another deposition can be employed using micro lens molding piece formed from ellipsoid openings (not shown).

Further, instead of these micro lens molding pieces of FIGS. 10A and 10B, a micro lens molding piece can be formed from a plurality of openings 2a having any one or combination of the circular, ellipsoid, and line state openings.

Figure 11:
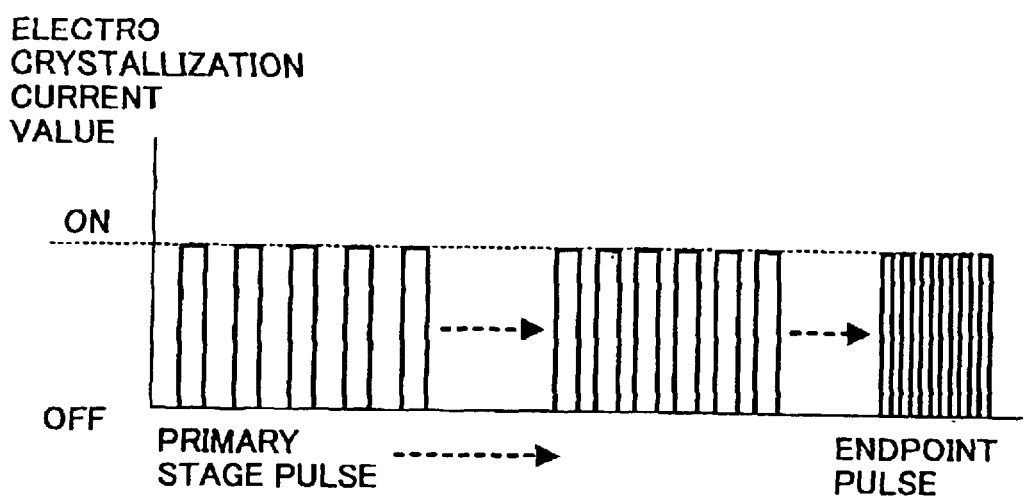
FIG. 11 illustrates a frequency of electro deposition pulse, at which Nickel brilliance electro deposition is performed as final electro deposition.

A frequency of pulse electro deposition that executes final Nickel brilliance electro deposition is now described with reference to FIG. 11. As shown, the Nickel brilliance electro deposition is performed at from 2 pluses per second as an initial frequency to 20 pulses per second as a final frequency.

In this way, since the final electro deposition is executed by the pulse electro deposition, and the frequency of the electro deposition is gradually increased, an electro deposition piece of low stress can be produced.

Figure 12:
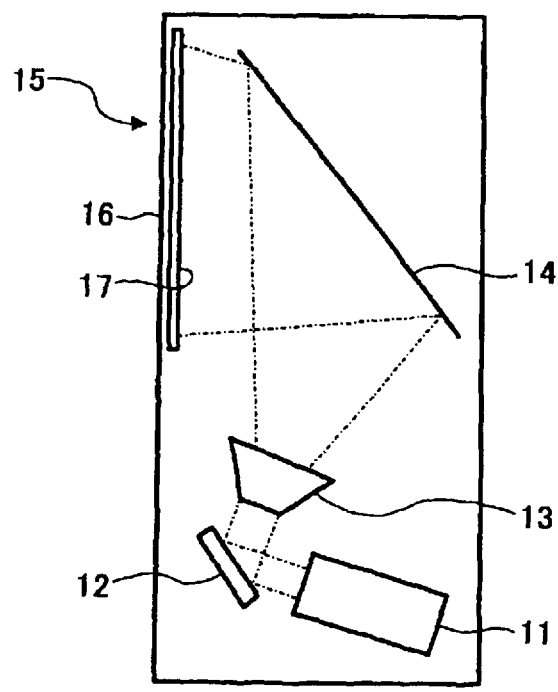
FIG. 12 schematically illustrates a backside projection type image displaying apparatus as one example of a projector.

A backside projection type image display apparatus is schematically described with reference to FIG. 12 as one example of a projector. As shown, the backside projection type image display apparatus includes an image forming section 11 formed from a liquid crystal panel and a light source for forming an image, a mirror 12 reflecting an image light toward a projection optical unit 13 that enlarges and projects the image light, and a mirror 14 reflecting the enlarged image light toward a backside of a screen 15 that displays the enlarged image on its front surface.

Specifically, an image formed by the image forming section 11 is projected from the backside surface of the screen 15 by the mirrors 12 and 14 and projection optical unit 13, and displayed while being enlarged.

The screen 15 is formed from an incident radiation side (i.e., backside) Fresnel lens 17, and a lens array sheet 16 serving as a screen sheet, to which a plurality of lens elements is opposed while being directed toward the Fresnel lens 17 side. Such a screen has a side of 2 meter, for example.

Specifically, the Fresnel lens 17 and lens array sheet 16 as a screen sheet having lens arrangement are disposed in the screen 15 in this order from the incident radiation side. In addition, a reflection suppressing film is arranged at the rearmost side (i.e., the viewer side) if desired.

The more distanced from the center of the screen 15 the more obliquely a light ray impinges on the surface of the screen 15, due to the fact that an image transmitted from the image forming section 11 is enlarged and projected thereunto. Then, the Fresnel lens 17 converts such a light to be vertical in relation to the lens array sheet 16.

Numerous additional modifications and variations of the present invention are possible in light of the above teachings. It is therefore to be understood that within the scope of the appended claims, the present invention may be practiced other than as specifically described in the examples herein.

This application claims priority under 35 USC § 119 to Japanese Patent Application No. 2002-255410 filed on Aug. 30, 2002, the entire contents of which are hereby incorporated by reference in this disclosure.

What is claimed is:

1. A micro lens molding piece, comprising:
   a substrate having electrical conductivity at least on its surface;

said surface being patterned with an insulation layer, said insulation layer including at least one opening;

an electro deposition start section exposed from the opening;

an electro deposition start electrode provided in the electro deposition start section and protruding from the insulation layer by a prescribed length, said prescribed length substantially determining a shape of a micro lens; and a metal layer electrically deposited in a shape of the micro lens by the electro deposition start electrode.

2. A micro lens molding piece, comprising:

a substrate having electrical conductivity at least on its surface;

a concavity and convexity pattern formed on the surface of the substrate, a vertical interval of said concavity and convexity pattern being determined in accordance with a shape of the micro lens;

an insulation layer formed on the concavity and convexity pattern, said insulation layer including at least one opening at a prescribed position of the concavity and convexity pattern;

an electro deposition start section formed on the surface of the substrate and exposed from the opening; and a metal layer electrically deposited by the electro deposition start section.

3. The micro lens molding piece according to claim 2, wherein said opening includes a peak of the concavity and convexity pattern.

4. The micro lens molding piece according to claim 2, wherein said opening includes a concave bottom of the concavity and convexity pattern.

5. A micro lens molding piece, comprising:

a substrate having electrical conductivity at least on its surface, said surface being patterned with an insulation layer;

a concavity and convexity pattern formed on the surface of the insulation layer, said insulation layer including at least one opening at a prescribed position;

an electro deposition start section formed on the surface of the substrate and exposed from the opening; and a metal layer electrically deposited by the electro deposition start section.

6. The micro lens molding piece as claimed in one of claims 1 to 5, wherein a shape of said opening is any one of circular, elliptic, line state, and any combination thereof.

7. A micro lens molding piece comprising:

a substrate having electrical conductivity at least on its surface;

said surface being patterned with an insulation layer, said insulation layer including at least one opening;

an electro deposition start section exposed from the opening;

an electro deposition start electrode provided in the electro deposition start section and protruding from the insulation layer by a prescribed length, said prescribed length substantially determining a shape of a micro lens;

a metal layer electrically deposited in a shape of the micro lens by the electro deposition start electrode; and an additional metal layer additionally electrically deposited on the surface of the metal layer firstly electrically deposited.

8. The micro lens molding piece as claimed in claim 7, wherein said electro deposition comprises pulse electro deposition, a frequency of which gradually increases from an initial to final stage.

9. The micro lens molding piece as claimed in claim 8, wherein said metal layer firstly electrically deposited is not a brilliance type, and said additional metal layer is a brilliance type.

10. A method for producing a molding piece in a micro lens shape, comprising the steps of:

patterning a surface of a substrate having electrical conductivity at least on its surface with an insulation layer;

forming an opening through the insulation layer at a prescribed position;

providing an electro deposition start section exposed from the opening electrically depositing a metal from the electro deposition start section; and determining a radius of curvature of the micro lens shape by changing a relative position between the opening and the electro deposition start section.

11. A method for producing a molding piece in a micro lens shape, comprising the steps of:

patterning a surface of a substrate having electrical conductivity at least on its surface with an insulation layer;

forming an opening on the insulation layer;

providing an electro deposition start section exposed from the opening;

providing an electro deposition start electrode in the electro deposition start section;

protruding the electro deposition start electrode from the insulation layer in accordance with the shape of the micro lens; and electrically depositing a metal by the electro deposition start electrode.

12. A method for producing a molding piece in a micro lens shape, comprising the steps of:

forming a concavity and convexity pattern on a substrate;

determining a vertical height in accordance with the micro lens shape;

providing an insulation layer on the concavity and convexity pattern;

forming an opening at a prescribed position of the concavity and convexity pattern through the insulation layer;

providing an electro deposition start section in the opening on the surface of the substrate; and performing electro deposition by the electro deposition start section.

13. The method according to claim 12, wherein said opening is formed to include a peak of the concavity and convexity pattern.

14. The method according to claim 12, wherein said opening is formed to include a concave bottom of the concavity and convexity pattern.

15. A method for producing a molding piece in a micro lens shape, comprising the steps of:

providing an insulation layer on a substrate;

forming a concavity and convexity pattern on the surface of the insulation layer;

determining a protrusion shape of the concavity and convexity pattern in accordance with the shape of the micro lens;

providing an opening through the insulation layer at a prescribed position;

providing an electro deposition start section in the opening; and performing electro deposition using the electro deposition start section.

16. The method as claimed in any one of claims 12 to 14, wherein said opening has any one of a circular shape, an elliptical shape, a line state shape, and combination of these shapes.

17. A method for producing a molding piece in a micro lens shape comprising the steps of:
    patterning a surface of a substrate having electrical conductivity at least on its surface with an insulation layer;
    forming an opening on the insulation layer;
    providing an electro deposition start section exposed from the opening;
    providing an electro deposition start electrode in the electro deposition start section;
    protruding the electro deposition start electrode from the insulation layer in accordance with the shape of the micro lens;
    electrically depositing a metal by the electro deposition start electrode; and
    electrically depositing an additional metal layer on the surface of the metal layer firstly electrically deposited.

18. The method as claimed in claim 17, wherein said electro deposition comprises pulse electro deposition, a frequency of which gradually increases from an initial stage to a final stage.

19. The method as claimed in claim 18, wherein said firstly deposition metal layer is not a brilliance type, and wherein said most additional metal layer is a brilliance type.

20. A micro lens STAMPER comprising a metal layer, said metal layer being produced by applying an electrically conductive layer to the micro lens molding piece as claimed in any one of claims 7–9, electrically depositing a metal layer using the conductive layer, and separating the metal layer from the micro lens molding piece.

21. A method for producing a micro lens STAMPER, the method comprising the steps of:
    providing conductivity to a micro lens molding piece produced as claimed in any one of claims 12–14 and 17–19;
    electrically depositing a metal layer using the conductive layer; and
    separating the metal layer from the micro lens molding piece.

22. A micro lens molding member produced by the steps of:
    employing the micro lens STAMPER as claimed in claim 20;
    performing injection molding; and
    further molding with heat and pressure.

23. A plastic lens array sheet produced by using the micro lens STAMPER as claimed in claim 20, performing injection molding, applying heat and pressure, and employing a step and repeat manner.

24. A projector employing the plastic lens array sheet claimed in claim 23.

25. A method of making a micro lens comprising:
    providing a substrate having an upper surface and a protection over said upper surface, said protection leaving selectively shaped openings to the substrate;
    forming electro deposition start sections at said openings, said electro deposition start sections extending up from the substrate by vertical distances selected to determine shapes of micro lenses;
    electro depositing a material, using said start sections for said depositing, to grow lens-shaped structures of said material starting at said start sections;
    using said substrate, with said lens-shaped structures thereon, to make a lens stamper having depressions related in shape to said lens-shaped structures; and
    using said stamper for make a micro lens having lenses related in shape to said depressions.

26. A method of making a micro lens comprising:
    providing a substrate having an upper surface and a protection over said upper surface, said protection leaving selectively shaped openings to the substrate;
    forming electro deposition start sections at said openings, said electro deposition start sections extending up from the substrate by vertical distances selected to determine shapes of micro lenses;
    electro depositing a material, using said start sections for said depositing, to grow lens-shaped structures of said material starting at said start sections;
    using said substrate, with said lens-shaped structures thereon, to make a lens stamper having depressions related in shape to said lens-shaped structures; and
    using said stamper for make a micro lens having lenses related in shape to said depressions,
    wherein said protection has an upper surface and said start sections extend vertically above said upper surface of the protection.

27. A method as in claim 26 in which vertical distances by which the start sections extend above the upper surface of the protection are selected to determine shapes of said micro lenses.

28. A method as in claim 26 in which said lenses have radii of curvature at sides of the lenses that are equal to or greater than the radii at tips of the lenses.

29. A method as in claim 28 in which the radii of said lenses are greater at the sides than at the tips thereof.

30. A method of making a micro lens comprising:
    providing a substrate having an upper surface and a protection over said upper surface, said protection leaving selectively shaped openings to the substrate;
    forming electro deposition start sections at said openings, said electro deposition start sections extending up from the substrate by vertical distances selected to determine shapes of micro lenses;
    electro depositing a material, using said start sections for said depositing, to grow lens-shaped structures of said material starting at said start sections;
    using said substrate, with said lens-shaped structures thereon, to make a lens stamper having depressions related in shape to said lens-shaped structures; and
    using said stamper for make a micro lens having lenses related in shape to said depressions,
    wherein said upper surface of the substrate has hills and valleys in cross section, and said start sections are at tips of said hills.

31. A method of making a micro lens comprising:
    providing a substrate having an upper surface and a protection over said upper surface, said protection leaving selectively shaped openings to the substrate;
    forming electro deposition start sections at said openings, said electro deposition start sections extending up from the substrate by vertical distances selected to determine shapes of micro lenses;
    electro depositing a material, using said start sections for said depositing, to grow lens-shaped structures of said material starting at said start sections;

using said substrate, with said lens-shaped structures thereon, to make a lens stamper having depressions related in shape to said lens-shaped structures; and using said stamper for make a micro lens having lenses related in shape to said depressions, wherein said upper surface of the substrate has hills and valleys in cross section, and said start sections are at bottoms of said valleys.

* * * * *